United States Patent [19]

Deebel et al.

[11] 3,851,191

[45] Nov. 26, 1974

[54] TELETHERMOMETER TRANSMITTER
[75] Inventors: George F. Deebel, New Haven; Bernard M. Doden; Myron J. Morris, both of Fort Wayne, all of Ind.
[73] Assignee: The Magnavox Company, Ft. Worth, Ind.
[22] Filed: Apr. 14, 1972
[21] Appl. No.: 244,154

[52] U.S. Cl.................. 307/310, 307/235, 307/271
[51] Int. Cl............................................. H01v 3/00
[58] Field of Search...... 340/177 CA; 307/271, 310, 307/235

[56] References Cited
UNITED STATES PATENTS

| | | | |
|---|---|---|---|
| 2,753,547 | 7/1956 | Donoth | 340/177 CA |
| 3,320,407 | 5/1967 | Holmes | 307/310 X |
| 3,449,695 | 6/1969 | Marsh | 307/271 X |
| 3,636,537 | 1/1972 | Terry | 340/177 CA |
| 3,643,113 | 2/1972 | Brock et al. | 307/271 |
| 3,649,877 | 3/1972 | Friedman | 340/177 CA |
| 3,764,831 | 10/1973 | Zwitter et al. | 307/271 |

OTHER PUBLICATIONS
Bell System Technical Journal, "Telstar", pp. 1050-1062, July 1963.

Primary Examiner—John S. Heyman
Attorney, Agent, or Firm—William W. Holloway, Jr.; Thomas A. Briody; Richard T. Seeger

[57] ABSTRACT

A portable battery operated telemetry transmitter is disclosed which senses temperature and provides a modulation signal the frequency of which is a linear function of the sensed temperature. A carrier is frequency modulated with this linear function to transmit the temperature information to a remote location. Means are also provided to time multiplex and transmit a signal representive of the transmitter battery conditions and a standard check signal indicative of satisfactory operation of the overall telemetry system.

29 Claims, 6 Drawing Figures $T_1$ $T_2$

TEMPERATURE $I_1$ $I_2$ $I_{C-E}$ $V_{STD.}$
$V_C$

COMPARATOR OUTPUT

PULSE FORMER

FLIP FLOP

FIG. 4 a 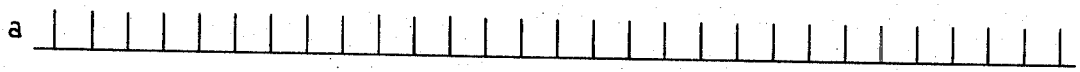
b 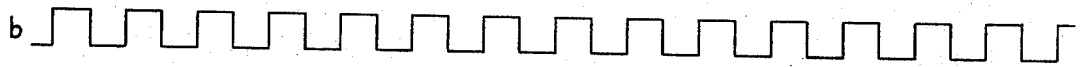
c 
d 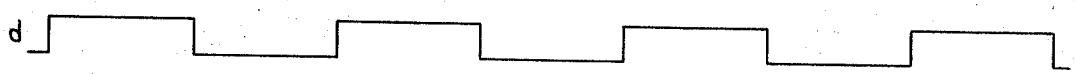
e 
f 
g 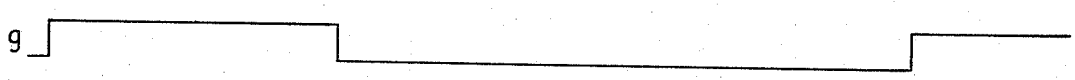
h 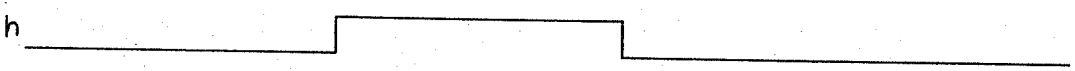
FIG 6

TELETHERMOMETER TRANSMITTER

CROSS REFERENCE TO RELATED APPLICATIONS

The present application represents a telemetry transmitter which may be used in conjunction with the telemetry receiver disclosed in U.S. Pat. No. 3,766,535, entitled "TELETHERMOMETER RECEIVER AND DISPLAY DEVICE", filed Apr. 14, 1972 and assigned to the assignee of the instant application, which combination provides a complete telemetry system.

BACKGROUND OF THE INVENTION

This invention relates to a telemetry transmitter and more particularly a temperature sensing device, several of which are to be employed with one telemetry receiver in monitoring the temperatures associated with specified ones of several items moving through a processing line. More particularly it is contemplated that the present invention will be employed to sense and transmit the temperature of an item being processed through an oven or cooling chamber. As an example, the immediate invention in combination with the aforementioned telethermometer receiver or an equivalent equipment may be utilized for monitoring the cooking, cooling, and storage temperature of food products during processing.

It is an object of the present invention to provide an economical telethermometer transmitter which can accompany a product through a heating and/or cooling process.

It is another object of the present invention to provide a unique scheme for converting temperature into frequency for telemetry transmission.

Yet another object of the present invention is to provide a highly accurate and reliable telethermometer.

SUMMARY OF THE INVENTION

The foregoing as well as other objects and advantages of the present invention are achieved by providing a temperature sensing probe containing a bi-polar transistor having linear temperature vs. base to emitter voltage characteristics and a unit for converting the current flowing through the bi-polar transistor into an output frequency indicative of the sensed temperature. This is accomplished by using the transistor collector current to charge a capacitor, comparing the voltage on that capacitor to a reference voltage, and providing an output signal when the two voltages are equal. This output signal is used to trigger a switching device which discharges the capacitor and also to trigger a flip-flop from which a square wave having a frequency which is one half the repetition rate of the comparator output pulses may be derived. After the capacitor is discharged it charges anew and its charging rate, and hence the comparator output pulse repetition rate and the square wave output frequency are dependent upon the current flowing in the bi-polar transistor which in turn bears a substantially linear relationship to the temperature of that transistor.

The present invention effects a temperature to frequency conversion which is a substantially linear relationship so that no calibration chart is required. The telemetry information is transmitted in the form of a frequency modulated signal and hence amplitudes are not critical in either the modulating or demodulating process. Similarly phase relationships cause no error and the modulation index or linearity is relatively unimportant, and thus errors introduced by the transmission system of the present invention are minimal.

It is therefore a further object of the present invention to provide a substantially linear temperature to frequency conversion system.

A still further object of the present invention is to provide a telemetry transmitter which minimizes the introduction of errors into the information being transmitted.

This linear relationship allows a constant ratio of temperature to data signal frequency to be utilized over the desired sensed temperature range and provides a means in the receiver or monitoring equipment for determination of the proper sign of the sensed temperature as is disclosed in the aforementioned copending application. In one embodiment, a sensitivity of 10 Hz per degree Fahrenheit was chosen whereby 3796 Hz and 6296 Hz represented −30 and +220° Fahrenheit respectively and where 4096 Hz represented 0° Fahrenheit.

The present invention, in addition to transmitting a signal which is a function of the sensed probe temperature also transmits data which indicates the condition of charge of the transmitter's internal battery supply and provides a predetermined temperature signal which may be utilized as a standard signal for evaluating and checking the operation and accuracy of the telemetering transmitter and/or receiver monitoring equipment.

The aforementioned standard temperature and battery condition data is time multiplexed with the sensed temperature data and supplied as a narrow band FM signal to an antenna for radiation to a remote monitoring location. Multiplexing is accomplished by the enabling of various gates in a time sequence controlled by a master clock signal.

The standard or check signal is provided by switching into the voltage to frequency converter, a predetermined and stable voltage ramp which in the described embodiment represents a predetermined fixed temperature. The switching of the sensed temperature signal, i.e. from the probe and the fixed and predetermined standard signal thus provides the proper stimulus to the frequency converter enabling FM transmission of both data.

In order to minimize current drain from the internal battery, COS/MOS and MOS integrated circuits are utilized where possible in the described embodiment; however, other types of circuits may be substituted as desired. In addition, the D.C. operating voltages for the FM transmitter oscillator and RF amplifier are applied only during those time periods when the various data signals are gated for transmission. The transmitter thus operates a duty cycle which in the described embodiment, results in an "on" time of approximately 3 1 seconds followed by an approximately 21 second "off" time prior to the next successive data transmission period. In addition, since the battery condition data is only transmitted when the battery voltage is below the standard battery voltage by a predetermined amount, an additional limiting of operating current drain from the internal battery supply is realized.

It is therefore a further object of the present invention to provide a battery operated portable telemetering transmitter which imposes a minimal operating load current on the internal battery supply.

It is therefore a further object of the present invention to provide for the transmission of a standard signal representing a known and predetermined temperature.

The battery condition signal in the described embodiment is provided by the gating of a 7.4 KHz modulation signal to the FM transmitter. The voltage of the battery which approximately represents the amount of charge remaining in the battery is determined by measuring the voltage at the input and output of a series voltage regulator. The battery voltage changes as the battery becomes depleted, however, the output of the series regulator is stable and substantially unaffected by changes in its input over the battery voltage range. A voltage comparator compares the input and output of the series voltage regulator by way of two resistive voltage dividing networks, and when the potential difference across the regulator drops below a predetermined level, a comparator output will be produced which will enable the gating of the 7.4 KHz signal to the transmitter. A signal is thus transmitted indicative of a depleted battery condition signifying the necessity of either battery recharging or replacement.

It is yet another object of the present invention to provide for the transmission of a signal indicative of a depleted or near depleted battery condition.

A still further object of the present invention is to provide a telemetry transmitter which is capable of transmitting to a remote point data including a sensed temperature signal, a standard signal, and a battery condition signal.

BRIEF DESCRIPTION OF THE DRAWING

FIG. 4 is a timing diagram illustrating the behavior of the circuit of FIG. 3;

FIG. 6 is a timing diagram for the circuit of FIG. 5.

DESCRIPTION OF THE PREFERRED EMBODIMENT

Figure 1:
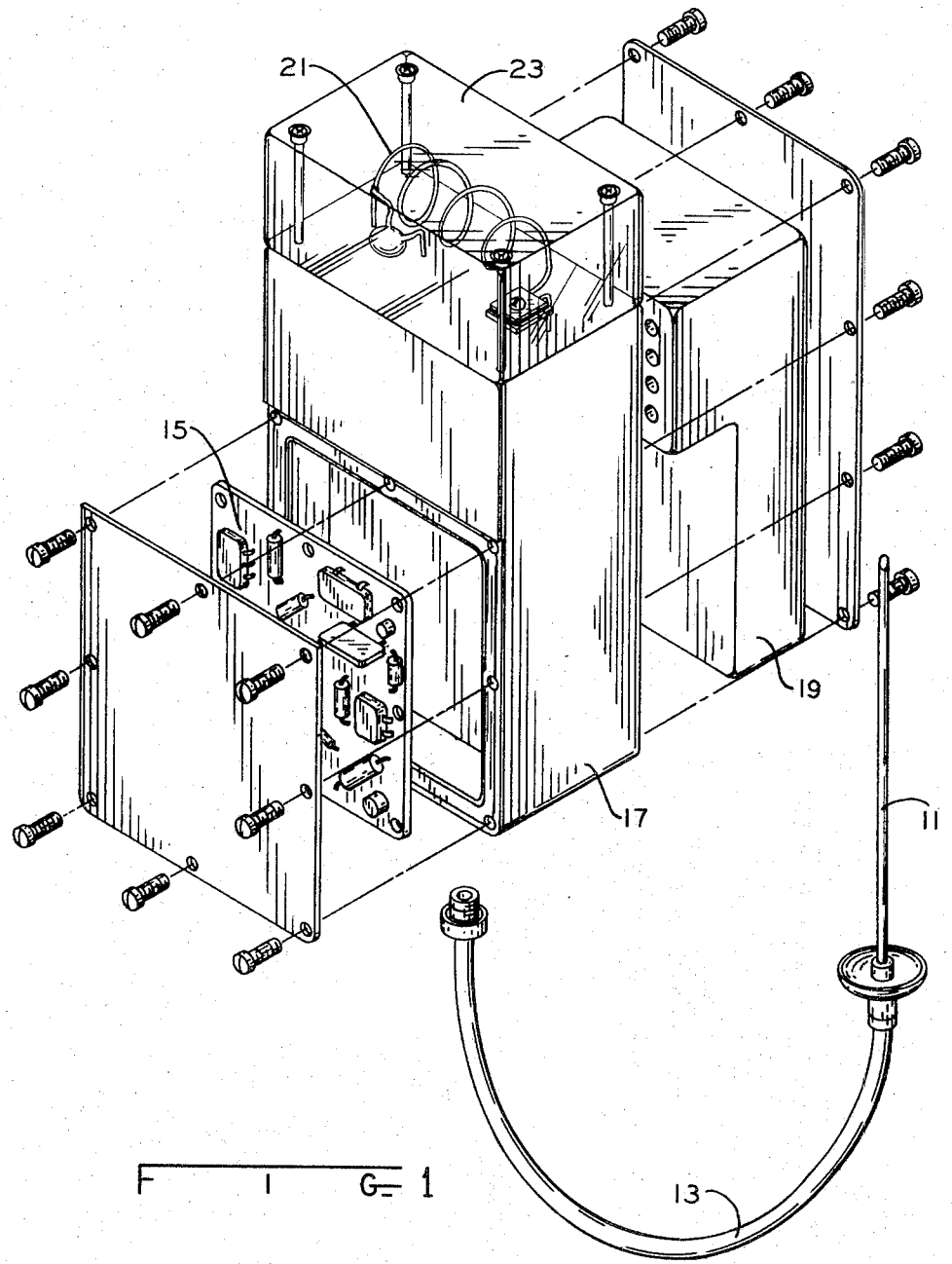
FIG. 1 is an exploded perspective view of the telethermometer transmitter of the present invention.

Considering first FIG. 1, the transmitter of the present invention is seen to be provided with a temperature probe 11 which is connected by way of a lead 13 to the encoding and transmitter circuitry 15 which is contained within a main housing 17. This housing also contains a battery 19 and an antenna system 21 which is, as illustrated, embedded in a dielectric material 23. The entire structure of FIG. 1 is designed to be placed adjacent, for example, a food product being conveyed on a conveyer belt through an oven with the probe 11 inserted into that food product. The inside of the oven may also contain an antenna for receiving the transmitted information and conveying that information to appropriate utilization equipment such as the telemetry receiver illustrated in the aforementioned copending application. The probe 11 will contain a transistor 25 in good thermal contact with the exterior of the probe 11 so that the temperature of the transistor 25 is substantially the same as that of the food product being monitored.

Figure 2:
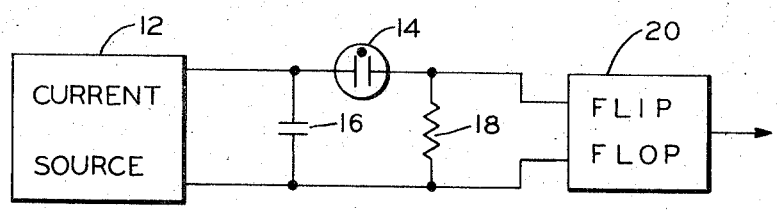
FIG. 2 is a simplified circuit diagram illustrating certain principles of the present invention.

The transistor 25, as will appear more clearly later in the discourse, can form the heart of a current source 12 in FIG. 2. FIG. 2 is a simplified form of the temperature to frequency conversion of the present invention presented primarily to aid in the understanding of the preferred embodiment illustrated in FIG. 3. This current source 12 provides a direct current output which is constant so long as the probe 11, and thus the transistor 25, remain at a constant temperature and which varies as a linear function of variable temperature. For purposes of illustration, the simple neon bulb 14 of FIG. 2 provides those functions of the voltage divider, comparator, and switch of FIG. 3 as will be later apparent. Neon bulb 14 is initially nonconducting, and thus the entire current from current source 12 functions to charge a capacitor 16. This capacitor 16 accumulates or integrates the current until such time as the voltage across the neon bulb 14 is sufficient to break that bulb down into its conducting state. When this happens capacitor discharge current flows from the capacitor 16 through a resistor 18 presenting an input signal to a flip-flop 20. Thus each time the neon bulb 14 conducts, the flip-flop 20 will change from one of its stable states to the other stable state. The circuit of FIG. 2 then serves to convert a current magnitude into a frequency associated with a square wave output. The frequency of this square wave output signal is a function of the repetition rate of the current discharge pulses through the resistor 18, and specifically the frequency of the square wave output is one half the repetition rate of the current discharge pulses which correspond to the conduction cycles of the neon bulb 14. In the embodiment of FIG. 2 the capacitor 16 will, of course, discharge only until the voltage across the neon bulb 14 drops to the point at which the bulb no longer conducts, at which time the current from source 12 will again begin to linearly increase the charge on capacitor 16.

As will appear later during the discussion of the current source of FIG. 3, a bi-polar transistor having substantially linear temperature vs. base to emitter voltage characteristics, such as the aforementioned transistor 25, may be employed so that the collector current bears a linear relationship to the temperature of that transistor, thus the current supplied by current source 12 at a temperature T is a linear function of that temperature and may be represented as:

(1) $i = K_1 T + K_2$, and thus the voltage across the capacitor 16 (having capacitance C) may be represented as an integral with respect to time as:

(2) $v = (1/C) \int (K_1 T + K_2)dt$, which under steady state temperature conditions simplifies to:

(3) $v = (KT + K)t/C + K_3$, which states the voltage across capacitor 16 to be a linear function of time, the slope of which is determined by the temperature being sensed and the circuit parameters which determine $K_1$, $K_2$, $K_3$ and of course C. For a specific neon bulb 14 having $V_1$ as its turn-on or break down voltage and $V_2$ as its extinction voltage, the time required for this circuit to complete one cycle is given by:

(4) $t = C (V_1 - V_2 - K_3)/(K_1 T + K_2)$ if we assume that the parameters are so selected that the discharge time is materially less than the time required to charge the capacitor 16. The resulting frequency of discharges through the resistor 18 is then given by:

(5) $f = (K_1 T + K_2)/C (V_1 - V_2 - K_3)$, which shows this frequency to be again a linear function of the temperature associated with the bi-polar transistor. A substantial but constant discharge time yields a similar result. Thus we start with a current which is a linear function of temperature and end up with a frequency applied to the flip-flop 20 which is a linear function of temperature. Since each signal or discharge occurring through the resistor 18 causes the flip-flop to change from one of its bi-stable states to the other, the frequency output from the flip-flop 20 is one half of the repetition rate of discharge pulses through the resistor 18, namely:

(6) $f_{out} = [K_1/2C (V_1 - V_2 - K_3)] T + K_2/2C (v_1 - V_2 - K_3)$.

$K_1$, $K_2$, $K_3$, C, $V_1$ and $V_2$ are all constants which are easily controlled by the circuit parameters involved and may be selected to give virtually any linear temperature to frequency transformation desired, and it has been found to be particularly useful to select these values so that:

(7) $K_1/2C (V_1 - V_2 - K_3) = 10$
and $K_2/2C (V_1 - V_2 - K_3) = 4096$.

It should be noted that 4096 is $2^{12}$, and any of several other integral powers of 2 are suitable for the constant term in this linear expression. The desirability of this particular selection of parameters in the circuit is illustrated in the aforementioned copending application.

Figure 3:
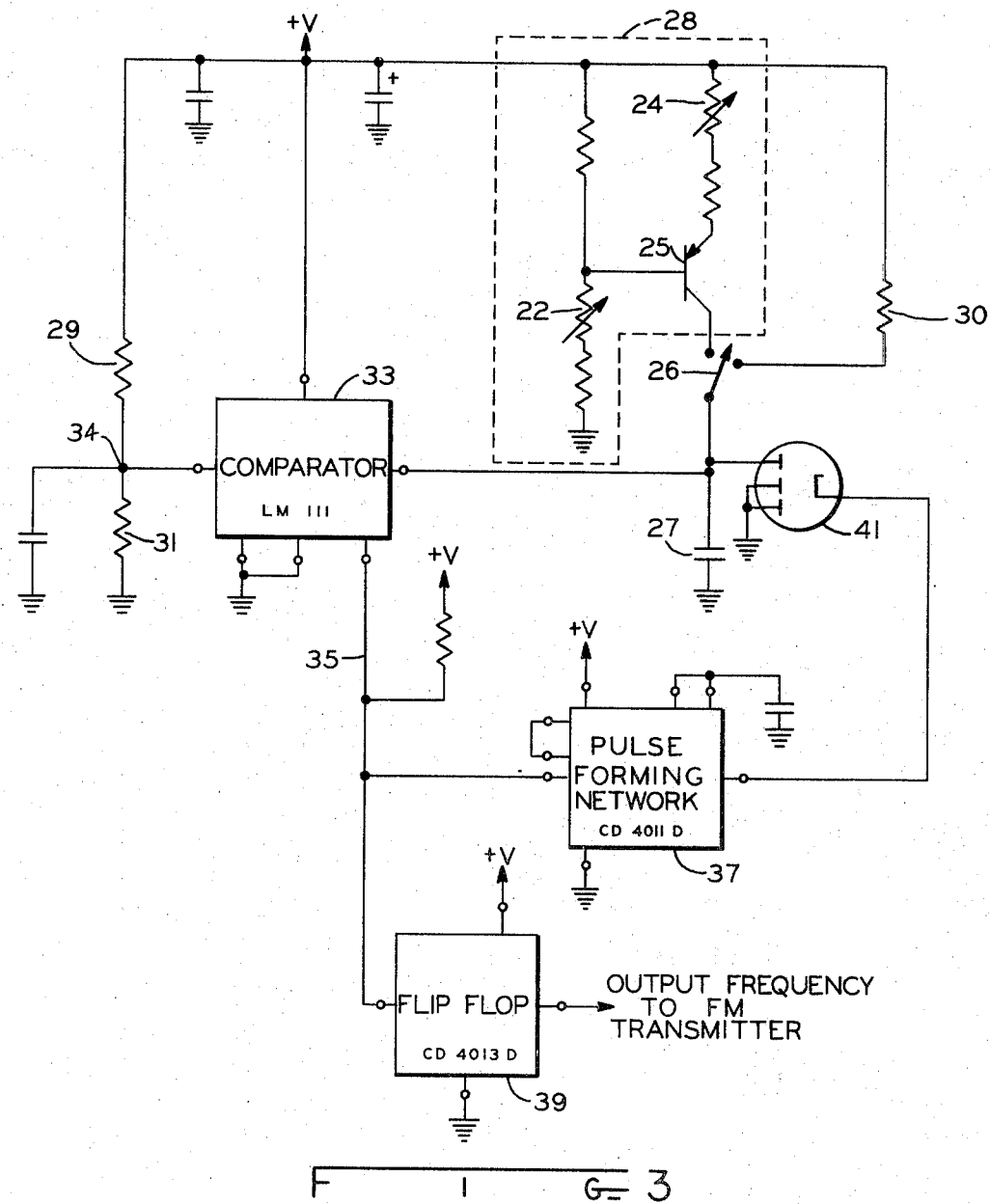
FIG. 3 is a schematic diagram of the temperature to frequency convertor.

This transistor 25 is also illustrated in FIG. 3 and is so disposed with respect to the remainder of the circuit that its collector current charges a capacitor 27, thus the capacitor 27 in essence functions to integrate the electrical output of the transistor 25 which senses the temperature at the probe 11. An electrical standard is provided in the form of the voltage divider network consisting of resistors 29 and 31 which are connected in series between two points of dissimilar reference potential. The electrical standard could also be a Zener diode, transistor, or the breakdown voltage of a neon bulb as in FIG. 2, or similar gas filled or solid state device. The electrical standard provided by the voltage divider network is supplied to a comparator 33 where it is constantly compared to the voltage across the capacitor 27. When the two voltages are equal the comparator 33 provides an output pulse on line 35 which is supplied to both the pulse forming network 37 and the pulse to frequency converting flip-flop 39. The flip-flop 39 is a simple bi-stable device which is responsive to each pulse received at its input to change from one of its bi-stable states to the other. Thus the flip-flop 39 provides an output square wave having a frequency which is one half of the repetition rate of the pulses supplied to it on line 35. The pulse forming network 37 modifies the shape and timing of the comparator output pulses and supplies the thus modified pulses to a switch 41 which is connected in parallel with the capacitor 27 so that when the switch 41 is enabled the charge on the capacitor 27 is diminished to substantially zero. The switch 41 conducts long enough to discharge the capacitor 27 while simultaneously forming a bypass for the current from transistor 25 to ground. The switch 41 then again becomes nonconductive, and the charge on capacitor 27 again begins to build. Thus a pulse from the comparator 33 by way of the pulse forming network 37 and the switch 41 returns the integrating means 27 to its initial state and also functions to change the state of the bi-stable means 39.

Figure 5:
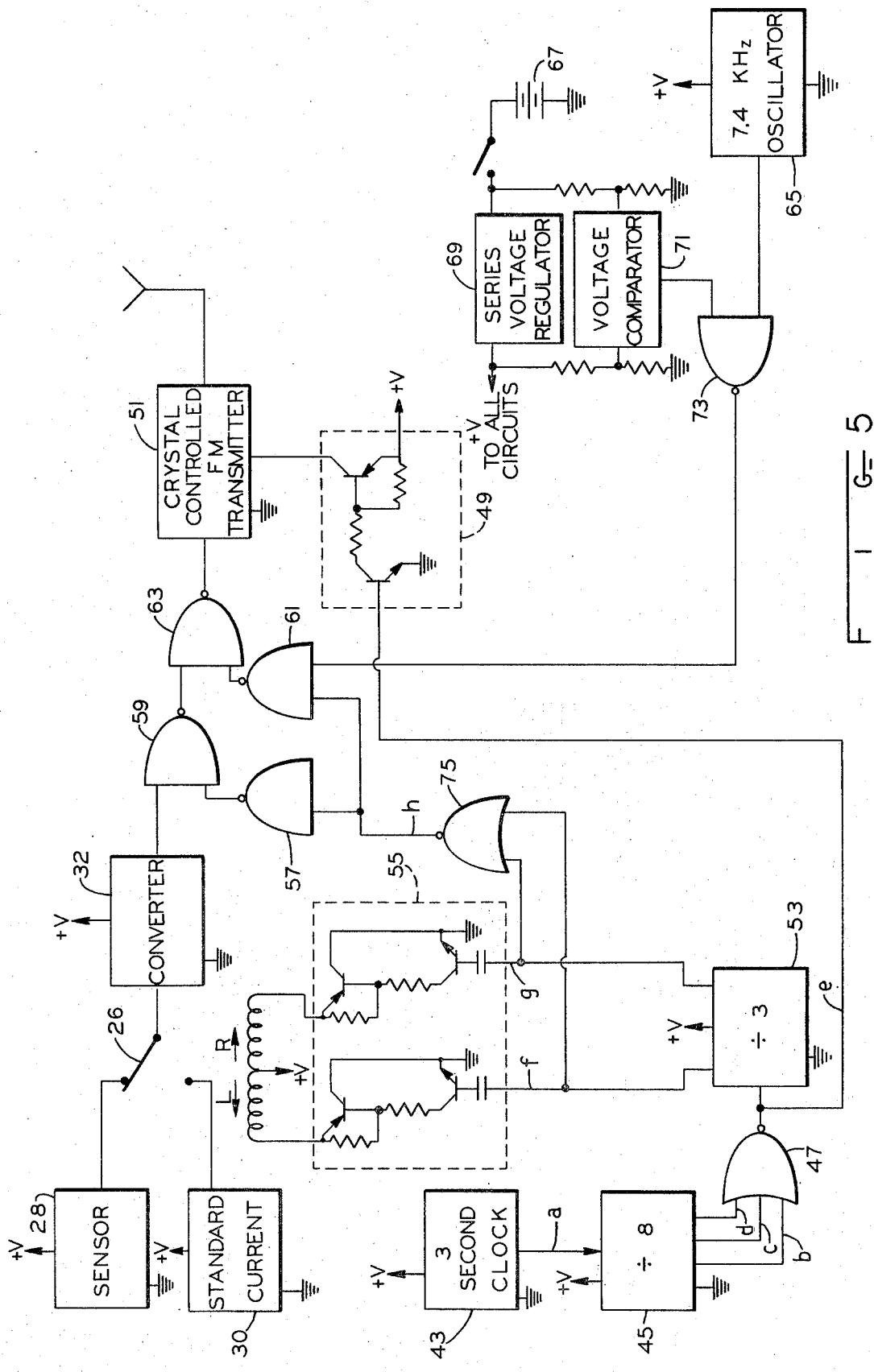
FIG. 5 is a block diagram of the telethermometer transmitter illustrated in FIG. 1.

The current source is enclosed in rectangle 28 of FIG. 3 and is also illustrated in FIG. 5. In order to allow for the interchangeability of current sources or probes it is desirable to provide two potentiometers 22 and 24. The potentiometer 24 controls the gain of the current source circuit, while the potentiometer 22 may be used to adjust the offset. With the proper choice of values for these two potentiometers as well as the other resistors found in the current source circuit, a 2 to 1 change in current over a −30 to 220° Fahrenheit temperature range may be obtained with a linearity of better than 1%.

The transistor 25 is an NPN type 2N2907 silicon bipolar transistor having substantially linear temperature vs. base to emitter voltage characteristics. The capacitor 27 may be in the neighborhood of 1 microfarad and may be a ceramic capacitor having very little leakage and being substantially unaffected by temperature changes.

The voltage comparator 33 may be a National Semiconductor's type LM 111 having a high gain and well defined threshold voltage. Its characteristics are that the input bias current is very low and input resistance very high. The voltage divider 29–31, of course, has the function of setting the threshold point for this comparator, and in the preferred embodiment illustrated in FIG. 3, this threshold was set at about 5.5 volts with a positive voltage supply of 8 volts.

The pulse forming network 37 can be a type CD4011D integrated circuit having three inverters thereon. The function of this pulse forming network is to make the narrow pulse output of the voltage comparator sufficiently wide to insure that the switch 41 will have sufficient time to discharge the capacitor 27 to a low value. The width of the pulse output from the pulse forming network is increased by connecting a capacitor from the output of the first inverter stage to ground. NAND or NOR gates could be employed in this pulse forming network as well as in numerous other points throughout the present preferred embodiment, however, the present preferred embodiment employs almost exclusively Complimentary Symmetry Metal Oxide Semiconductors (COS/MOS) which are integrated circuits containing P and N channel MOS transistors. Their use in the pulse forming network 37 makes this network directly compatible with the switch 41 which is a silicon N channel MOS field effect transistor operating in an enhancement mode so that a low potential on the gate will cause it to present essentially an open circuit, and a high potential on the gate will turn the device on making the drain to source resistance quite low.

The pulse to frequency converter 39 is a COS/MOS flip-flop type CD4013D. Such COS/MOS circuitry in the present application has the advantage that it operates on voltage levels, and thus the inputs to such circuitry do not load the remaining circuitry. COS/MOS circuitry also has good temperature stability.

The comparator output pulses as well as other wave forms associated with the circuit of FIG. 3 are illustrated in FIG. 4. As a hypothetical example, assume that the temperature of the probe 11 and thus of the transistor 25 is initially at $T_1$ and at a later time has dropped to $T_2$. Under these circumstances the collector current of the transistor 25 will also experience a drop and this current is illustrated by the wave form $I_{c-e}$ in FIG. 4. Prior to the temperature drop this constant current charges the capacitor 27 in a linear manner until the voltage across this capacitor as illustrated by the wave form $V_c$ in FIG. 4 reaches the same value as the electrical standard potential at point 34 of FIG. 3. The potential at point 34 thus corresponds to the peak value, $V_{STD.}$, of $V_c$. The slope of the linearly increasing portion of the wave form $V_c$ is, of course, $I_1/C$ since the value of the charging current is not a function of time except during temperature transistions.

The comparator output as illustrated in FIG. 4 is in the form of a relatively narrow pulse, and this pulse is shaped in a pulse forming network to produce an output pulse illustrated in FIG. 4 having proper and consistent amplitude and width to enable the switch 41 of FIG. 3 to substantially completely discharge the capacitor 27. The output from the flip-flop 39 of FIG. 3 is illustrated as the last wave form in FIG. 4 and it can be seen that this flip-flop output changes from one of its stable states to the other stable state on each occurrence of a comparator output pulse.

The foregoing discussion presumes that the switch 26 has been in position to connect the collector of transistor 25 to the capacitor 27. This switch 26 may also be used to couple a standard current source 30 to the capacitor 27 and thus provide a standard voltage ramp on the capacitor 27 for equipment testing purposes. This standard current source may simply be a resistor circuit coupled between the positive voltage supply and the capacitor, and this standard current source 30 along with the current source 28 and switch contacts 26 are illustrated in FIG. 5. The remaining circuitry of FIG. 3 is included within the convertor 32 of FIG. 5.

FIG. 5 serves to illustrate how the varying frequency indicative of temperature provided by the circuit of FIG. 3 may be transmitted to a remote receiver and further illustrates an energy conserving scheme for multiplexing that temperature information with calibrating information from the voltage standard and other monitoring information such as, for example, a signal indicative of battery depletion. The circuit of FIG. 5 may be most easily understood when read in conjunction with FIG. 6, which illustrates wave forms at several points within the block diagram of FIG. 5.

A clock 43 provides a narrow pulse output every 3 seconds, as illustrated by wave form $a$, and this clock signal is provided to a divide by eight counter 45 of the simple three stage flip-flop variety. Wave forms $b$, $c$ and $d$ then, of course, illustrate the outputs of these three flip-flops which are combined in a NOR gate 47. The NOR gate 47 provides an output signal only when all of its inputs are in their zero state, and this occurs once for a 3 second interval in each 24 second interval, as illustrated in wave form $e$. Thus the counter 45 and NOR gate 47 serve to take a series of narrow pulses at 3 second intervals and provide a series of pulses at 24 second intervals each having a 3 second duration.

Wave form $e$ may be used to turn on the transmitter for 3 seconds and then turn it off for 21 seconds, thus providing a duty cycle for the transmitter which conserves battery energy. A two transistor switch 49 is energized by the positive 3 second pulses of the wave form $e$ to supply positive D.C. voltage $(+V)$ to the transmitter 51. The switch 49 as well as the switches 55 which energize the latching relay associated with the switch contacts 26 comprises a pair of complementary transistors coupled so that when a positive voltage is applied to the base of the input transistor the second transistor is forced into saturation to thus present the enabling voltage $+V$ to the transmitter modulator 51. Thus the transmitter 51 is energized only during the 3 second positive pulses of wave form $e$ and is otherwise quiescent to save energy and substantially increase battery life.

The wave form $e$ is also supplied to a divide by three counter 53 which may, for example, comprise two concatenated flip-flop stages with reset logic circuitry to reset the counter to zero one pulse count earlier than would occur in the normal two flip-flop (modulo 4) counter. Thus the positive going pulse of wave form $f$ may indicate the one state of the first flip-flop and the positive going pulse of wave form $g$ the one state of the second flip-flop. A NOR gate 75 may be employed responsive to the wave forms $f$ and $g$ to provide yet another series of positive going pulses, which occur only when neither of the inputs to the NOR gate are positive. The wave forms $f$, $g$ and $h$ together function to repetitively divide each 72 second interval into three equal subintervals of 24 seconds duration each with one pulse of wave form $e$ occurring during each subinterval. These three wave forms may be employed to sequentially gate three different signals to the FM transmitter 51.

Wave form $g$ is presented to the base of the input transistor of one of the switches 55, and conduction of that transistor in turn causes the second transistor of the switch pair to saturate and allow current to flow from the $+V$ voltage source through the R portion of the relay associated with contacts 26. This causes the contact blade to assume the position shown and supply current proportional to the sensed temperature to the convertor 32 for conversion into a square wave output, the frequency of which is proportional to that temperature. This wave form is supplied by way of gates 59 and 63 to the crystal controlled transmitter 51 for transmission to a remote location. The relay contacts are of a latching variety and will remain in the position shown until the occurrence of a positive going pulse of wave form $f$, which causes the appropriate pair of transistors in the switch 55 to conduct and thus energize the L portion of the relay coil to move the switch contacts 26 so as to couple the standard current source to the convertor 32. The relay also latches in this position. Thus during the positive going pulse portion of the wave form $g$ temperature information is passed to the convertor 32, and during the positive going pulse portion of wave form $f$ standard voltage is applied to the convertor 32 to modulate the transmitter by way of gates 59 and 63 to transmit a predetermined or calibrating indication. Of course, as noted earlier, actual transmission occurs only during the positive pulse portions of wave form $e$ so as to conserve energy. Wave forms $f$ and $g$ are thus effective to supply sensed or standard indications to the convertor 32 two thirds of the time with the remaining available time represented by the positive pulse wave form $h$. Wave form h is generated by passing the wave forms $f$ and $g$ through a NOR gate 75 which provides an output only when neither of its inputs are energized. Wave form $h$ is passed through a gate 57 which functions as an inverter, the output of which enables or disables the gate 59. Thus during positive pulse portions of wave form $h$ the gate 59 is disabled. The positive pulse portions of wave form h also enable gate 61 to supply whatever signal may be at the output of gate 73 by way of gate 63 to the FM transmitter 51.

The output of gate 73 may be a 7.4 kilocycle warning signal generated by the oscillator 65 and indicative of a depleted battery condition. The gate 73 is enabled to pass this warning signal by the output of a voltage comparator 71, which indicates that the potential difference across the series voltage regulator 69 has exceeded predetermined limits.

Thus while the present invention has been described with respect to a specific embodiment, numerous modifications will suggest themselves to those of ordinary skill in the art, and accordingly the scope of the present invention is to be measured only by that of the appended claims.

What is claimed is:

1. A device for sensing a temperature and for generating an electrical signal having a frequency which is a substantially linear function of the temperature sensed comprising:
   means for generating a current having a magnitude which is a substantially linear function of the temperature being sensed;
   a capacitor adapted to be charged by said current;
   a voltage standard;
   means for comparing the voltage on said capacitor and said voltage standard and providing an output signal each time the voltage on said capacitor equals the voltage standard;
   first means responsive to said output signals for discharging said capacitor; and
   second means responsive to said output signals for providing an electrical signal the frequency of which is a function of the repetition rate of said output signals.

2. The device of claim 1 wherein said second means comprises a bi-stable device responsive to each said comparison output signal to change its state and to thereby provide an output square wave having a frequency which is one half the repetition rate of the comparison output signals.

3. The device of claim 2 wherein said first means comprises a switching device connected in parallel with said capacitor and responsive to said comparator output signal to substantially discharge said capacitor.

4. The device of claim 1 wherein the means for generating comprises a transistor having substantially linear temperature vs. base to emitter voltage characteristics, said transistor being connected in series with said capacitor to thereby charge said capacitor at a rate proportional to the transistor temperature.

5. The device of claim 4 wherein said first means comprises a switching device connected in parallel with said capacitor and responsive to said comparator output signal to substantially discharge said capacitor.

6. The device of claim 4 wherein said second means comprises a bi-stable device responsive to each said comparison output signal to change from one of its bi-stable states to the other and to thereby provide an output square wave having a frequency which is one half the repetition rate of the comparison output signals.

7. The device of claim 6 wherein said first means comprises a switching device connected in parallel with said capacitor and responsive to said comparator output signal to substantially discharge said capacitor.

8. The device of claim 1 wherein said first means comprises a switching device connected in parallel with said capacitor and responsive to said comparator output signal to substantially discharge said capacitor.

9. A device for sensing a temperature and for generating an electrical signal having a frequency which is a substantially linear function of the temperature sensed comprising:
   means for generating a current having a magnitude which is a substantially linear function of the temperature being sensed;
   a capacitor adapted to be charged by said current; and
   means for providing an output signal when the voltage on the capacitor reaches a predetermined value and for discharging said capacitor to thereby provide a series of output signals, one for each occasion that the voltage on the capacitor reaches said predetermined value.

10. The device of claim 9 further comprising means responsive to said output signals for providing an electrical signal the frequency of which is a function of the repetition rate of said output signals.

11. The device of claim 9 wherein the last mentioned means comprises a bi-stable device responsive to said output signals to change its state and to thereby provide an output square wave having a frequency which is one half the repetition rate of the output signals.

12. A telemetry transmitter comprising:
   means for sensing a physical phenomenon and providing a linear electrical output indicative thereof;
   means for integrating said electrical output;
   an electrical standard; and
   means for comparing said integral to said standard and for providing an electrical output each time said integral and said standard are equal.

13. The transmitter of claim 12 further comprising means for returning said integrating means to its initial state in response to a comparison output.

14. The transmitter of claim 12 further comprising means for converting said comparison outputs to an alternating current signal having a repetition rate which is a function of the rate of recurrence of said comparison outputs.

15. The transmitter of claim 14 further comprising means for returning said integrating means to its initial state in response to a comparison output.

16. The transmitter of claim 12 wherein the physical phenomenon sensed is temperature and the means for sensing comprises a transistor having substantially linear temperature vs. base to emitter voltage characteristics.

17. The transmitter of claim 16 wherein said integrating means comprises a capacitor connected in series with said transistor to thereby be charged by the current flowing in said transistor.

18. The transmitter of claim 17 further comprising means for discharging said capacitor in response to a comparison output.

19. The transmitter of claim 18 further comprising means for converting said comparison outputs to an alternating current signal having a repetition rate which is a function of the rate of recurrence of said comparison outputs.

20. The transmitter of claim 12 wherein said integrating means comprises a capacitor adapted to be charged by said electrical output.

21. The transmitter of claim 20 wherein the physical phenomenon sensed is temperature and the means for sensing comprises a transistor having substantially linear temperature vs. base to emitter voltage characteristics, said transistor being connected in series with said capacitor to thereby charge said capacitor at a rate proportional to the transistor temperature.

22. The transmitter of claim 20 further comprising means for discharging said capacitor in response to a comparison output.

23. The transmitter of claim 22 wherein said means for discharging comprises a pulse forming network responsive to said means for comparing for providing an output gating signal, and a switching device connected in parallel with said capacitor and responsive to said output gating signal to substantially discharge said capacitor.

24. The transmitter of claim 21 wherein said electrical standard comprises first and second points of dissimilar reference potential and a voltage divider network coupled therebetween, said transistor and capacitor series circuit being at least indirectly coupled between said first and second points.

25. The transmitter of claim 24 further comprising a removable temperature probe, said transistor being disposed in said removable temperature probe, and a variable resistance in circuit with said transistor whereby said probe may be removed and another probe substituted in its place and the transmitter recalibrated by varying said variable resistor.

26. The transmitter of claim 12 further comprising a bi-stable device responsive to said comparison outputs to change its state and to thereby provide an output square wave having a frequency which is one half the repetition rate of the comparison electrical outputs.

27. The transmitter of claim 26 wherein the integrating means comprises a capacitor and further comprising means for discharging said capacitor in response to a comparison output whereby said capacitor is discharged twice for each cycle of the output square wave.

28. The transmitter of claim 27 wherein the physical phenomenon sensed is temperature and the means for sensing comprises a transistor having substantially linear temperature vs. base to emitter voltage characteristics, said transistor coupled to said capacitor so as to charge said capacitor at a rate determined by the transistor temperature whereby a transformation from temperature to frequency substantially according to $f = K_1 T + K_2$ is effected where $T$ = temperature, $f$ = frequency and $K_1$ and $K_2$ are constants.

29. The transmitter of claim 28 where $K_2$ is of the form $2^n$ where $n$ is an integer.

* * * * *